A. A. ANDERSON.
TRAFFIC CONTROL SEMAPHORE.
APPLICATION FILED SEPT. 1, 1915.
1,181,719.
Patented May 2, 1916.
2 SHEETS—SHEET 2.
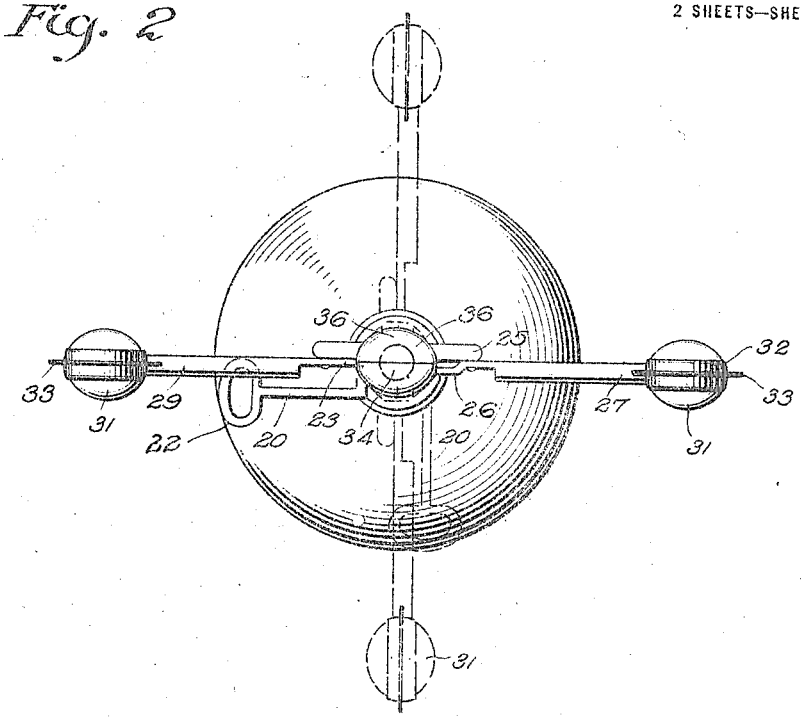
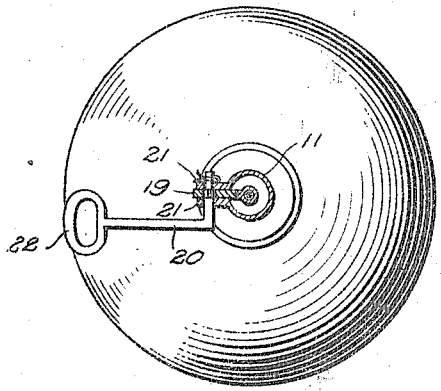
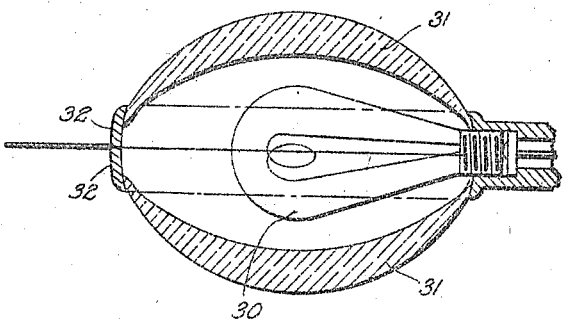
WITNESSES
INVENTOR
A. A. Anderson
BY
ATTORNEYS

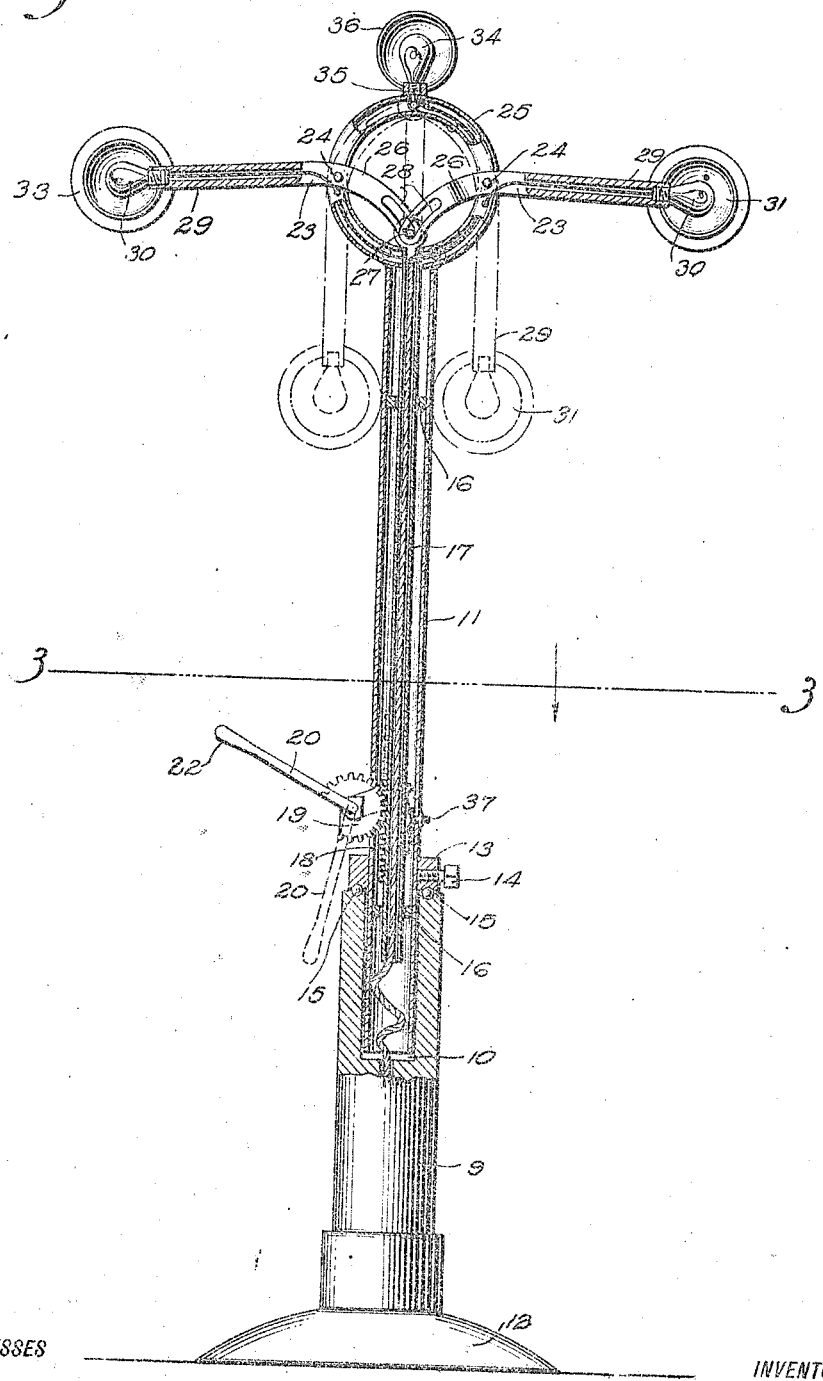

UNITED STATES PATENT OFFICE.

ABRAM ARCHIBALD ANDERSON, OF NEW YORK, N. Y.

TRAFFIC-CONTROL SEMAPHORE.

1,181,719.

Specification of Letters Patent.

Patented May 2, 1916.

Application filed September 1, 1915. Serial No. 48,459.

*To all whom it may concern:*

Be it known that I, ABRAM A. ANDERSON, a citizen of the United States, and a resident of the city of New York, borough of Manhattan, in the county and State of New York, have invented a new and Improved Traffic-Control Semaphore, of which the following is a full, clear, and exact description.

Among the principal objects which the present invention has in view are: to provide a traffic signaling apparatus, which may be seen at a distance; to provide the said apparatus with movable members adapted for arrangement in correspondence with the movements conventionally understood as signifying certain intentions on the part of the operator thereof; to provide a semaphore with a plurality of arms provided each with indicating means visible at night; and to provide an apparatus of the character mentioned with means for transmitting visible signals to a distant station.

*Drawings.*—Figure 1 is a vertical section of a semaphore constructed and arranged in accordance with the present invention, the section being taken on the median line thereof; Fig. 2 is a top plan view of a semaphore constructed and arranged in accordance with the present invention and showing in full and dotted lines, diametrically opposed operating positions for said apparatus; Fig. 3 is a cross section of the apparatus taken as on the line 3—3 in Fig. 1; and Fig. 4 is a detail view on an enlarged scale, showing in section, one of the targets with which the semaphore is provided.

*Description.*—A relatively heavy stand 9 is provided. The upper end of the stand is cored or bored to form a chamber 10, to permit of stepping a hollow tubular mast 11 therein. The stand 9 is preferably permanently and securely mounted at the center of a junction of cross roads. The apparatus may, however, be portable, in which case the stand is provided with an anchoring wedged base plate 12.

The mast 11 is constructed from a hollow tube and of any suitable length. A supporting collar 13 is fixedly attached to the mast 11 by a set screw 14. The collar 13 is fixed in such position as to hold the lower end of the mast 11 above the bottom of the chamber 10, as seen best in Fig. 1 of the drawings. The collar 13 is also used to form a bearing whereon the mast is rotated. To this end the collar 13 rests on the bearing balls 15, which rest in an annular race formed in the upper edge of the stand 9.

Mounted at suitable intervals within the mast 11 are perforated disks 16 which form guides for a tubular connecting rod 17. The rod 17 has extended from the side thereof a rack 18, the teeth whereof are engaged by teeth formed in a quadrant 19. The quadrant 19 is rigidly attached to an operating handle 20. The handle 20 is pivotally mounted in brackets 21 formed in the mast 11, as best shown in Fig. 3 of the drawings. At the outer end of the handle, there is formed a hand grip 22, which the operator grasps when manipulating the handle 20 to raise and lower the rod 17 or to swing the mast 11 on the bearing formed by the balls 15.

The rod 17 is operatively connected with the semaphore arms 23. The arms 23 are pivoted by pins 24 in a head ring 25 rigidly mounted upon the mast 11. The ends 26 are curved to approximately correspond with the curvature of the head ring 25, when the arms 23 are dropped to their inactive positions, as shown in Fig. 1 of the drawings. The operative connection between the arms 23 and the curved ends 26 thereof with the rod 17, is formed by a pin 27, set out from the said rod and extending through the curved slots 28 formed in the ends 26. The length of the slots 28 accommodates the swing of the ends 26 about the pins 24, when the rod 17 is raised and lowered.

The arms 23 have tubular sections 29 adjacent the outer ends thereof. These sections are provided at the extreme ends with sockets arranged to receive electric lamps 30. The lamps 30, as shown best in Fig. 4 of the drawings, are disposed between diffusing lenses 31, which form the targets of the semaphore or signal. The lenses 31 are suitably mounted in metal frames 32, which may be separated to install or renew the lamps 30. Supported by one of the frames 32 and extended therefrom is a flange 33. The flange 33 is colored so as to be seen from a distance in the day time.

At the extreme top of the ring 25, the lamp 34 is mounted, a spiral socket 35 being mounted on the ring 25 to receive said lamp. The lamp 34 is mounted in a globe 36. The globe 36 and the lenses 31 are suitably colored, the former being tinted green, while the latter are tinted red. The globe 36 may be viewed from all points without reference to the position to which the mast 11 and the ring 25 is rotated, while it is obvious that if the frames 32 and lenses 31 are disposed edgewise to the traffic, the lamps 30 will be partially concealed.

*Operation.*—Having an apparatus constructed as described, the operation thereof is as follows: When the officer in charge of a station desires to suspend traffic on the roadway, he engages the handle 20 by the grip 22 thereof and swings the mast 11 to a position where the arms 23 are transversely disposed to the traffic. If the arms are in the inactive position shown by dotted lines in Fig. 1 of the drawings, the handle 20 will be disposed in the lowered position, as also shown by dotted lines in said Fig. 1. The mast having been moved to the desired position, the officer lifts the handle 20 to the position shown in full lines in Fig. 1. In doing this, the teeth in the quadrant 19 engage the teeth in the rack 18 and lower the rod 17, depressing thereby the ends 26 of the arms 23, which are moved to the horizontal and outstretched position shown by full lines in Fig. 1 of the drawings. If it is daylight, the drivers of the vehicles approaching the semaphore, see the targets and particularly the flange 33 thereof and are warned to stop thereby. If it be night, the lights of the lamps 30 are illumined and operate to advise the drivers of the warning position of the semaphore arms. Due to the height at which the mast 11 lifts the warning signal, these may be viewed from a distance and the various drivers may be thus apprised of the suspension of the traffic before arriving dangerously near the blocked station. If the semaphore is being operated at the junction of two or more busy thoroughfares, where the desire is to periodically suspend and relieve the traffic in the crossing ways, the officer having suspended the traffic in one of the roads without lowering the arms 23, swings the mast 11 to the position diametrically opposed to that lately held. This will advise the drivers on the crossing roads of the changed instruction. If, however, the installation is not designed for the control of the traffic in two roads, as for instance, when the semaphore is arranged adjacent to a railroad crossing, the permission to proceed after suspension, would be indicated by dropping the handle 20 and the arms 23 to the positions indicated by dotted lines in said Fig. 1 of the drawings. The lamp 34 is illuminated only when the officer at the station presses the button 37 to close the circuit in which the said lamp is incorporated. The button 37 as shown in Fig. 1, is mounted in the mast 11 just above the collar 13. By manipulating the button 37 in accordance with an established code, the lamp 34 could be flashed or temporarily illuminated to convey a warning or message to the officer in charge of a station at a point distant from that at which the signals originated. It is obvious that while it is preferred to normally hold the lamp without illumination, this may be reversed and the lamp 34 be placed normally in circuit, said circuit to be broken instead of completed by the manipulation of the button 37.

Claim:

A semaphore comprising a stationary stand; a tubular mast rotatively mounted on said stand; a plurality of tubular arms pivotally mounted on said mast; a tubular connecting rod pivotally connected with said arms at the juxtaposed ends thereof; a rack fixedly mounted on said connecting rod adjacent the lower end thereof; a quadrant pivotally mounted on said mast and having teeth adapted to mesh with the teeth of said rack; and a handle rigidly connected with said quadrant and extending from the side of said mast to be operable for raising and lowering the said connecting rod and for rotating said mast.

In witness whereof I have signed my name to this specification in the presence of two subscribing witnesses.

ABRAM ARCHIBALD ANDERSON.

Witnesses:
ELEANOR M. ANDERSON,
ELISE NOSSELET.